United States Patent Office 3,457,257
Patented July 22, 1969

3,457,257
6-AMINOPENICILLANIC ACID AND 7-AMINO-CEPHALOSPORANIC ACID DERIVATIVES
Stephen Hanessian and Gunter R. Schutze, Ann Arbor, Mich., assignors to Parke, Davis & Company, Detroit, Mich., a corporation of Michigan
No Drawing. Filed May 11, 1967, Ser. No. 637,630
Int. Cl. A61k 21/00; C07d 93/08, 91/16
U.S. Cl. 260—239.1    5 Claims

ABSTRACT OF THE DISCLOSURE 2,4,6-trimethylcycloheptatriene-carboxylic acid derivatives of 6-aminopenicillanic acid and of 7-aminocephalosporanic acid; and their production by reacting 2,4,6-trimethylcycloheptatriene-1-carboxylic acid or a reactive derivative thereof with one of the designated amino acids. The products exist in both free acid and salt forms. They have antibacterial activity including substantial activity against both penicillin-sensitive and penicillin-resistant strains of staphylococci.

SUMMARY AND DETAILED DESCRIPTION

The present invention relates to new organic amides. More particularly, the invention relates to new 2,4,6-trimethylcycloheptatriene-1-carboxamides of the formula

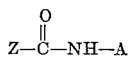

to salts thereof, and to methods for the production of the foregoing compounds; where Z represents 2,4,6-trimethylcycloheptatrienyl and A represents a group of the formula

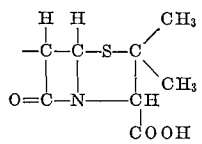

or a group of the formula

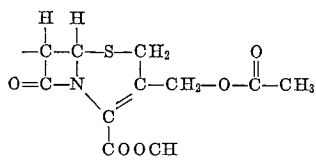

In accordance with the invention, the foregoing compounds can be produced by reacting 2,4,6-trimethylcycloheptatriene-1-carboxylic acid or a reactive derivative thereof with an amine of the formula

where A is as defined before. Some examples of suitable reactive derivatives of 2,4,6-trimethylcycloheptatriene-1-carboxylic acid are the acid halides, the azide, or an anhydride, including a mixed anhydride. The preferred reactant is an acid halide and especially the acid chloride. The carboxylic acid or its reactive derivative and the amine are usually employed in approximately equimolar quantities, although an excess of either can be used if desired. The reaction can be carried out in any of a variety of unreactive solvents including acetone, tertiary amides such as dimethylformamide, or chlorinated hydrocarbons such as chloroform or dichloromethane. A base to serve as an acid-binding agent can also be present and is desirably present in those cases where an acid halide is a reactant. Some examples of suitable bases for this purpose are pyridine, triethylamine, N-methylmorpholine, or sodium bicarbonate. A preferred solvent is dichloromethane containing triethylamine as a base. Depending on whether 2,4,6-trimethylcycloheptatriene-1-carboxylic acid or one of its reactive derivatives is used, the time and temperature of the reaction can be varied over relatively wide limits. Using the preferred acid chloride, the recommended temperature range for carrying out the reaction is between —10 to 30° C. Within this temperature range the reaction is substantially complete within 1 to 3 hours. During the reaction, it is customary to hold the pH between 5 and 9 by the addition of the necessary amount of a base or a buffer. The product is isolated either as the free acid or as a carboxylate salt by adjustment of the pH as required. For example, the reaction mixture can be evaporated to dryness and the residue treated with acetone to separate and remove any insoluble material. The acetone solution containing the product is evaporated to give a residue which is then dissolved in water and acidified to a pH of about 2 to 2.5. This solution is extracted with ethyl acetate and the solvent evaporated to give the product in the form of the free acid. Alternatively, the free acid is treated with any of a variety of organic and inorganic bases to yield the corresponding carboxylate salts.

The 2,4,6-trimethylcycloheptatriene-1-carboxylic acid and its reactive derivatives required as starting materials in the foregoing process can be prepared by any of a variety of methods. The acid itself is described at "Berichte der Deutschen Chemischen Gesellschaft," 53, 870 (1920) and is the compound identified on that page as having the formula $C_{11}H_{14}O_2$. The acid chloride can be prepared by reaction of the acid with phosphorus pentachloride as described on the same page of the reference. The acid chloride can also be prepared by heating a mixture of the acid and thionyl chloride in ether containing a small amount of pyridine, for 2 hours at reflux, followed by evaporating to dryness and storing the product in a vacuum over solid potassium hydroxide. Other reactive derivatives of 2,4,6-trimethylcycloheptatriene-1-carboxylic acid can be prepared according to general methods known in organic chemistry for converting a carboxylic acid to its functional derivatives.

The free acids of the invention form carboxylate salts with any of a variety of inorganic and organic bases. Pharmaceutically-acceptable carboxylic salts are formed by reaction with such bases as sodium hydroxide, sodium carbonate, sodium bicarbonate, potassium hydroxide, potassium carbonate, potassium 2-ethylhexanoate, calcium carbonate, ethylamine, 2-hydroxyethylamine, and procaine. A preferred base for formation of the potassium salt is potassium 2-ethylhexanoate, which gives a product having good physical form. The alkali metal salts are preferred carboxylate salt forms. The carboxylate salts are converted to the free acids by acidification. The free acids and their carboxylate salts differ in solubility properties but in general are otherwise equivalent for the purposes of the invention.

The compounds of the invention are useful as pharmacological agents and as chemical intermediates. They exhibit antibacterial activity and, for example, are effective against both penicillin-sensitive and penicillin-resistant strains of staphylococci. They are active upon oral administration but can also be given by the parenteral route if desired. The compounds of the invention can also be employed as in vitro antibacterial agents.

The invention is illustrated by the following examples.

Example 1

A solution of 0.39 g. of 2,4,6-trimethylcycloheptatriene-1-carboxylic acid chloride in 20 ml. of dichloromethane is added dropwise to a stirred solution of 0.42 g. of 6-aminopenicillanic acid, 0.7 ml. of triethylamine, and 7 ml. of dichloromethane maintained at 0–5° C.

The mixture is stirred 2½ hours after addition is complete and then allowed to warm to 15° C. The mixture is concentrated almost to dryness, diluted with 20 ml. of acetone and filtered to remove insoluble material. The filtrate is evaporated and the residue is dissolved in 15 ml. of water and the solution covered with 15 ml. of ethyl acetate. After adjustment of the pH to 2.2 with 10% solution of cold sulfuric acid and thorough mixing, the ethyl acetate phase is separated and the aqueous phase extracted again with ethyl acetate. The ethyl acetate extracts are combined and dried over anhydrous sodium sulfate. A portion of the ethyl acetate solution is evaporated to give a residue of the free acid, 3,3-dimethyl-7-oxo-6(2,4,6-trimethylcycloheptatriene - 1 - carboxamido)-4-thia-1-azabicyclo[3.2.0]heptane-2-carboxylic acid. The remainder of the ethyl acetate solution is treated dropwise with 1 ml. of a 50% solution of potassium 2-ethylhexanoate in butanol. The mixture is concentrated to a volume of 5 ml. and diluted with ether until precipitation of the product is complete. The mixture is allowed to stand overnight and the product is collected on a filter, washed with ether, and dried over phosphorus pentoxide. It is potassium 3,3-dimethyl - 7 - oxo-6-(2,4,6-trimethylcycloheptatriene - 1 - carboxamido)-4-thia-1-azabicyclo[3.2.0]heptane-2-carboxylate. The compound was tested for antibacterial activity by vitro assay. Against penicillin-sensitive staphylococci, the minimal inhibitory concentration was 0.4 microgram per ml. Against penicillin-resistant staphylococci, the minimal inhibitory concentration was 6.3 micrograms per ml.

By following the foregoing general procedure, but modified so that the combined ethyl acetate extracts are neutralized by the addition of dilute sodium carbonate solution to pH 7, following which the aqueous phase is separated and freeze-dried, the product is the corresponding sodium salt. This sodium salt is dried over phosphorus pentoxide.

A solution of 0.138 g. of the potassium salt described above in 5 ml. of water is treated with an equimolar amount of procaine hydrochloride in 5 ml. of water. The mixture is chilled at 0° C. for several hours and the insoluble procaine salt of 3,3-dimethyl-7-oxo-6-(2,4,6-trimethylcycloheptatriene - 1 - carboxamido)-4-thia-1-azabicyclo[3.2.0]heptane-2-carboxylic acid is collected on a filter. An additional quantity of the procaine salt can be precipitated by adding 2.5 g. of soduim chloride to the filtrate.

Example 2

Equimolar quantities of 2,4,6-trimethylcycloheptatriene-1-carboxylic acid chloride and 7-aminocephalosporanic acid are reacted and the product isolated following treatment with potassium 2-ethylhexanoate according to the procedure of Example 1. The product is potassium 3-(acetoxymethyl) - 8 - oxo-7-(2,4,6-trimethylcycloheptatriene - 1 - carboxamido)-5-thia - 1 - azabicyclo[4.2.0]oct-2-ene-2-carboxylate. The compound was tested for antibacterial activity by in vitro assay. Against penicillin-sensitive staphylococci, the minimal inhibitory concentration was 0.8 microgram per ml. Against penicillin-resistant staphylococci, the minimal inhibitory concentration was 12.5 micrograms per ml.

The corresponding calcium salt is obtained as follows. The procedure indicated above is followed through the acidification to pH 2.2 and until the product has been extracted into ethyl acetate. The ethyl acetate extract is stirred with saturated calcium hydroxide solution by adding small portions of the calcium hydroxide solution until the aqueous phase is approximately neutral. The aqueous phase is then separated and freeze-dried to produce the calcium salt. It is renedered anhydrous by drying over phosphorus pentoxide.

The free acid is obtained by following the procedure through the acidification to pH 2.2 and until the product has been extracted into ethyl acetate. Evaporation of the ethyl acetate then gives a residue of the free acid, 3-(acetoxymethyl) - 8 - oxo-7-(2,4,6-trimethylcycloheptatriene-1-carboxamido)-5-thia - 1 - azabicyclo[4.2.0]oct-2-ene-2-carboxylic acid.

We claim:

1. A member of the class consisting of compounds of the formula

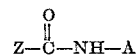

and pharmaceutically-acceptable salts thereof; where Z represents 2,4,6-trimethylcycloheptatrienyl and A is a member of the class consisting of a group of the formula

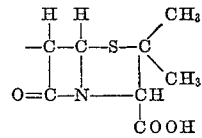

and a group of the formula

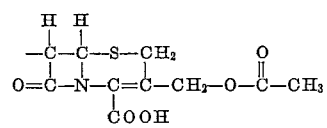

2. A compound according to claim 1 in the form of a free carboxylic acid.

3. A compound according to claim 1 in the form of an alkali metal salt.

4. Potassium 3,3-dimethyl - 7 - oxo-6-(2,4,6-trimethylcycloheptatriene - 1 - carboxamido)-4-thia-1-azabicyclo-[3.2.0]heptane-2-carboxylate.

5. Potassium 3-(acetoxymethyl) - 8 - oxo-7-(2,4,6-trimethylcycloheptatriene - 1 - carboxamido)-5-thia-1-azabicyclo[4.2.0]oct-2-ene-2-carboxylate.

References Cited

UNITED STATES PATENTS 3,284,445  11/1966  Hermann et al. _____ 260—239.1

NICHOLAS S. RIZZO, Primary Examiner

U.S. Cl. X.R.

424—246, 271